(12) United States Patent
Coffey, Jr.

(10) Patent No.: US 7,108,794 B1
(45) Date of Patent: Sep. 19, 2006

(54) RECYCLED TIRE PIPE FLUID PURIFICATION PROCESS AND APPARATUS FOR LIQUIDS INCLUDING STORMWATER

(76) Inventor: Ray Stratton Coffey, Jr., 134 Jefferson Ct., Staunton, VA (US) 24401

( * ) Notice: Subject to any disclaimer, the term of this patent is extended or adjusted under 35 U.S.C. 154(b) by 11 days.

(21) Appl. No.: 11/103,013

(22) Filed: Apr. 11, 2005

(51) Int. Cl.
*B01D 24/02* (2006.01)
(52) U.S. Cl. .................................................. 210/807
(58) Field of Classification Search .............. 210/282, 210/287, 807
See application file for complete search history.

(56) References Cited

U.S. PATENT DOCUMENTS

| | | | |
|---|---|---|---|
| 2,278,488 A * | 4/1942 | Ralston | 210/282 |
| 4,066,244 A * | 1/1978 | Yoho | 256/1 |
| 4,824,287 A | 4/1989 | Tracy | 405/36 |
| 5,941,238 A | 8/1999 | Tracy | 126/641 |
| 6,428,691 B1 * | 8/2002 | Wofford | 210/151 |
| 6,533,501 B1 | 3/2003 | Callinan et al. | 405/229 |
| 6,705,803 B1 | 3/2004 | Callinan et al. | 405/229 |
| 6,796,325 B1 | 9/2004 | Courier | 137/357 |

FOREIGN PATENT DOCUMENTS

GB  2221479  2/1990

* cited by examiner

*Primary Examiner*—Ivars C. Cintins

(57) ABSTRACT

A method of conveying and purifying fluids including stormwater by passing fluid through an assemblage of tires fastened together by physical and chemical means, and an apparatus for carrying out the same method, are disclosed.

The apparatus according to the invention comprises a series of axially aligned used tires help together by adhesive and metal or plastic bands. Organic or inorganic filters at each end of the assemblage serve to further purify the fluid and reduce the possibility of insect breeding within the filter.

1 Claim, 1 Drawing Sheet

RECYCLED TIRE PIPE FLUID PURIFICATION PROCESS AND APPARATUS FOR LIQUIDS INCLUDING STORMWATER

BACKGROUND OF THE INVENTION

1. Field of the Invention

This invention relates generally to fluid treatment systems, specifically to a system composed primarily of used tires with provision for insect breeding control.

2. Description of the Related Art Including Information Disclosed Under 37CFR 1.97 and 1.98.

Lawrence Tracy disclosed a sewage treatment system in Great Britain patent 2221479 utilizing discarded vehicle tires. Similar in that they employed tires, U.S. Pat. Nos. 6,705,803 and 6,705,803 by Callinan provided layers of tires with fill material for use in filtration. The Tracy invention was designed for sewage and is not capable of the large volume of flowing fluid addressed in the invention disclosed herein. The Callinan design, while utilizing tires as a filter medium, does not provide the benefit of also employing the tires as a substitute for manufactured pipe for conveyance of the liquid to be treated.

Courier in U.S. Pat. No. 6,796,325 disclosed a stormwater retention apparatus which did not involve the use of tires.

BRIEF SUMMARY OF THE INVENTION

An object of the invention is to provide a simplified method for utilizing discarded tires in the construction of fluid treatment systems.

Another object of the invention is to provide an apparatus resulting from the method noted above.

According to one aspect of the present invention, there is provided a method for construction of fluid treatment pipes with decreased probability of providing an insect breeding environment, which comprise the steps of gluing tires together in axial alignment and fitting the open ends with mesh containers filled with filter material.

According to another aspect of the present invention, there is provided a fluid treatment apparatus, which comprises tires glued and banded with metal or plastic strips as necessary in axial alignment and fitted with mesh filter bags at the open ends to form fluid treatment pipes.

These and other advantages, features and objects of the invention will be appreciated upon review of the following description of the invention when comprehended in conjunction with the attached drawings with the understanding that modifications, variations and alterations may be accomplished by those skilled in the art of the field of the disclosed invention without departing from the spirit or scope of the claims appended hereto.

DETAILED DESCRIPTION OF THE INVENTION

To attain the objects as noted above the inventor analyzed established and innovative fluid treatment systems with a view to replacing new manufactured components with recycled materials, while identifying the minimum components required for an operational unit. It was discovered that used tires could replace new concrete or plastic pipes and chambers with a minimum of modification, labor, materials and expense. The invention is predicated in this finding.

More particularly, the present invention features the method of gluing and banding together as necessary used tires to instantly construct a filtration pipe for use in fluid filtration.

Briefly, according to the invention used tires are glued together to form components of fluid treatment systems. Fluids, including stormwater, flowing through the axially aligned tires will tend to be slowed by friction and gravity and will tend to deposit some of their sediments in the lower sections of the tires. The anterior and posterior ends of the tire pipe are capped with mesh bags filled with filter media such as plastic foam peanuts or wood chips to help prevent the formation of an insect breeding environment.

Now, preferred embodiments of the invention will be described with reference to the drawings.

Figure 1:
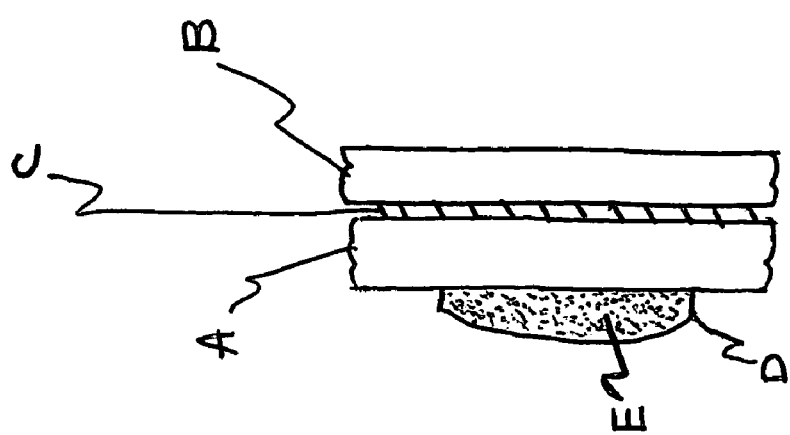
FIG. 1 is a side view of the first steps in the construction process of the invention-gluing two used tires together in axial alignment and attaching a mesh bag filled with filtration media to the anterior opening of the pipe tire filtration unit.

FIG. 1 is a side view showing an embodiment of the present invention. More specifically, the Figure shows an apparatus, which comprises a used tire A cemented to used tire B with glue C. This is the building block of the invention. To help prevent the formation of an insect breeding environment, mesh bag D containing filter media E is glued to Used tire A thus forming the anterior end of the apparatus. The process of gluing tires together in axial alignment is continued as necessary to produce an apparatus of the desired dimensions.

Figure 2:
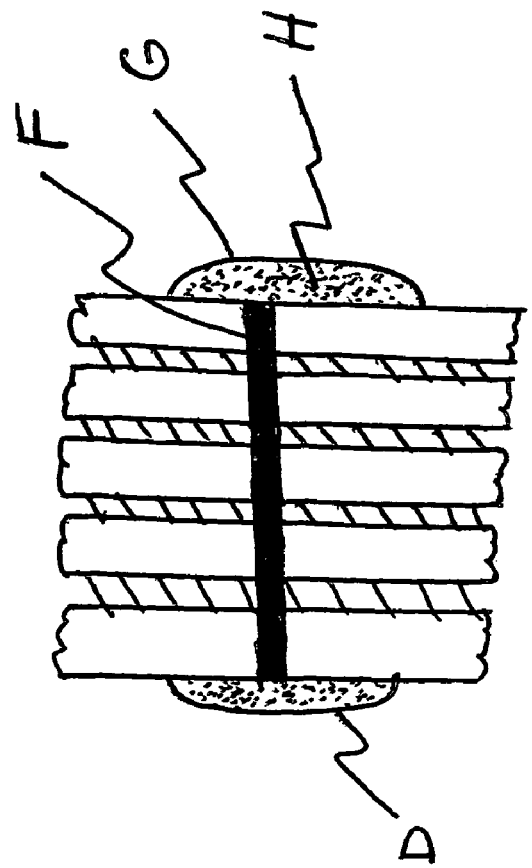
FIG. 2 is a side view of a completed tire pipe filtration unit for fluids including stormwater.

This process results in a component, as in FIG. 2, in this illustration five tires glued together in axial alignment. Band F has been added and completely encircles the tires providing additional structural integrity for situations where increase in weight or stress on the apparatus may occur. Band F is a plastic or metal strap similar to those used to secure the items on a wooden or plastic pallet.

To place the apparatus in operation, fluid, including stormwater, is directed through mesh bag E into the interior of the tire pipe filtration unit as shown in its entirety in FIG. 2. The fluid flows through the apparatus and exits through mesh bag H. This tire pipe filtration may be utilized in any orientation, horizontal or vertical.

The specifics contained in the above description should not be construed as limits on the scope of the invention. Many variations are possible within the teachings of the invention.

Thus the scope of the invention should be determined by the following claims and their legal equivalents:

The invention claimed is:

1. A method for treating storm water with a fluid treatment system constructed from used tires comprising:
   A. cementing used tires in axial alignment with industrial glue to form a tire structure having anterior and posterior openings;

B. attaching plastic or metal straps lengthwise around said tire structure;

C. gluing media filled mesh bags to the anterior and posterior openings of said tire structure, said media being selected from the group consisting of plastic foam peanuts and wood chips;

D. directing storm water through one of said media filled mesh bags into the interior of said tire structure and out through the other of said media filled mesh bags, thereby helping to prevent the formation of an insect breeding environment.

* * * * *